United States Patent
Brown

(10) Patent No.: US 9,004,058 B1
(45) Date of Patent: Apr. 14, 2015

(54) PATIO ACCESSORY AND BARBEQUE GRILL SYSTEM

(76) Inventor: Curtis D. Brown, Winnsboro, SC (US)

(*) Notice: Subject to any disclaimer, the term of this patent is extended or adjusted under 35 U.S.C. 154(b) by 406 days.

(21) Appl. No.: 13/486,159

(22) Filed: Jun. 1, 2012

(51) Int. Cl.
*A47J 37/07* (2006.01)
*F24C 3/00* (2006.01)
*F24C 15/08* (2006.01)
*F24C 1/16* (2006.01)
*F24C 3/14* (2006.01)
*F24B 1/195* (2006.01)

(52) U.S. Cl.
CPC ..................................... *F24C 3/002* (2013.01)

(58) Field of Classification Search
CPC ... A47J 37/07; A47J 37/0713; A47J 37/0647; A47J 37/0682; A47J 2037/07; F24C 15/08; F24C 3/14; F24C 1/16; F24C 1/205; F24B 1/202
USPC .......... 126/39 B, 25 R, 29, 30, 41 R; 248/146
IPC ...... A47J 37/07; F24C 1/16, 3/14, 15/08; F24B 1/195, 1/20
See application file for complete search history.

(56) References Cited

U.S. PATENT DOCUMENTS

| | | | |
|---|---|---|---|
| 2,666,426 A * | 1/1954 | Pollard | 126/25 R |
| 4,886,045 A * | 12/1989 | Ducate, Jr. et al. | 126/41 R |
| 5,163,359 A * | 11/1992 | McLane, Sr. | 99/447 |
| 5,255,664 A * | 10/1993 | Gurliacci | 126/276 |
| D429,944 S | 8/2000 | Alle | |
| D436,284 S | 1/2001 | Mak | |
| D442,818 S | 5/2001 | Cragg | |
| 6,298,774 B1 | 10/2001 | Latham et al. | |
| D485,115 S | 1/2004 | Barrett | |
| 6,705,307 B2 * | 3/2004 | Alden et al. | 126/41 R |
| D497,076 S | 10/2004 | Sutcliff et al. | |
| 2003/0200962 A1 * | 10/2003 | Pruett | 126/276 |
| 2005/0045169 A1 * | 3/2005 | Baris et al. | 126/25 R |
| 2005/0155596 A1 * | 7/2005 | Andrews et al. | 126/25 R |
| 2005/0155597 A1 * | 7/2005 | Wolter et al. | 126/25 R |
| 2005/0217660 A1 * | 10/2005 | Wilson | 126/25 R |
| 2005/0229917 A1 * | 10/2005 | Profitt et al. | 126/25 R |
| 2008/0060633 A1 * | 3/2008 | Antwine | 126/25 R |
| 2008/0066730 A1 * | 3/2008 | Ducate | 126/42 |
| 2008/0229937 A1 * | 9/2008 | Stephen et al. | 99/421 R |
| 2009/0050131 A1 * | 2/2009 | Lee | 126/25 R |
| 2009/0122563 A1 * | 5/2009 | Ko et al. | 362/418 |

(Continued)

OTHER PUBLICATIONS

"13486159_Google Search—barbecue automotive theme Aug. 22, 2014"; Web Search; http://www.google.com; Aug. 22, 2014.*

*Primary Examiner* — Gregory Huson
*Assistant Examiner* — Daniel E Namay

(57) ABSTRACT

A barbeque grill and outdoor patio accessory system with an automotive theme has a barbeque grill with a multi-component automobile-shaped upper housing. The system has a grill control panel having a general form of an automobile dashboard. Upon activation of a keyed switch the burner igniter provides the ignition spark for the burner, and the audio playback system plays pre-recorded audio themed sounds. The system has an integrated patio lighting assembly with a light housing having a general shape of an automobile wheel and tire assembly. The light housing is located in a general area with respect to the wheel and tire assembly location on a typical automobile. The lighting member can be extended out and away from the first side upper housing via a telescopic pole. The lighting member is pivotally located on a pole second end via a ball and socket joint.

1 Claim, 4 Drawing Sheets

(56) References Cited

U.S. PATENT DOCUMENTS

| | | | |
|---|---|---|---|
| 2009/0165774 A1* | 7/2009 | Johnston et al. | 126/25 R |
| 2009/0201663 A1* | 8/2009 | Tsung | 362/92 |
| 2010/0103656 A1* | 4/2010 | Cho | 362/198 |
| 2010/0139642 A1* | 6/2010 | Pliml | 126/25 R |
| 2010/0242943 A1* | 9/2010 | Laporta et al. | 126/25 B |
| 2010/0330399 A1* | 12/2010 | Grossman | 429/7 |
| 2012/0037143 A1* | 2/2012 | Chung | 126/25 R |
| 2012/0234308 A1* | 9/2012 | Faulk et al. | 126/25 R |
| 2012/0234309 A1* | 9/2012 | Horito et al. | 126/25 R |
| 2012/0285438 A1* | 11/2012 | Serrano | 126/25 R |
| 2013/0112088 A1* | 5/2013 | May | 99/421 H |
| 2013/0112187 A1* | 5/2013 | Cedar et al. | 126/15 A |
| 2013/0180412 A1* | 7/2013 | Contarino, Jr. | 99/446 |
| 2013/0298896 A1* | 11/2013 | Johnson | 126/25 R |
| 2014/0090633 A1* | 4/2014 | Gleaton et al. | 126/213 |

* cited by examiner

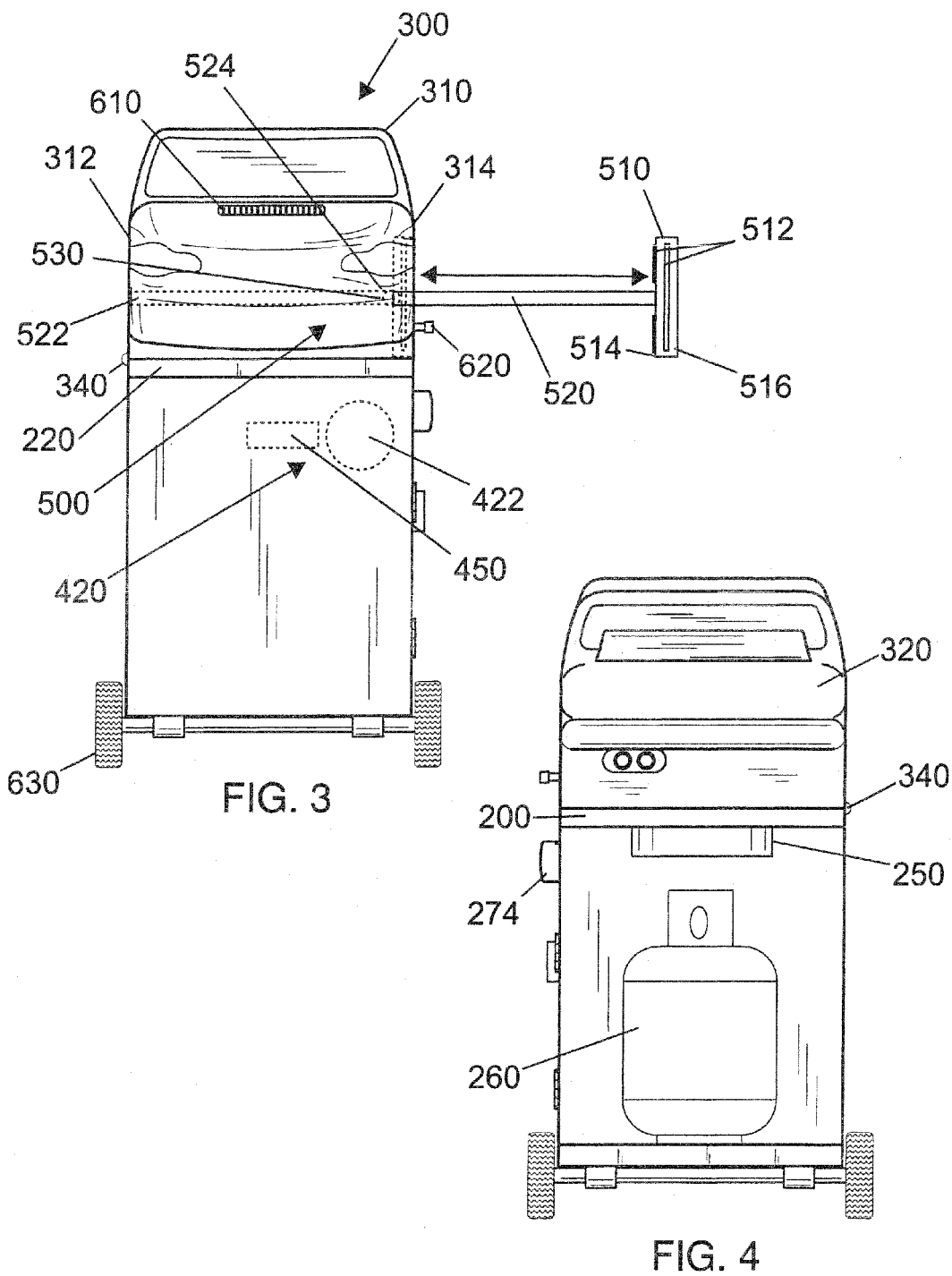

PATIO ACCESSORY AND BARBEQUE GRILL SYSTEM

BACKGROUND OF THE INVENTION

Modern barbeque grills came into existence based on the development of a hemispheric grill design by George Stephen of Weber Brothers Metal Works and the advent of charcoal briquettes by E.G. Kingsford after witnessing a large amount of wood scraps being discarded from Henry Ford's assembly lines. Later, in the 1960s, a gas grill design was developed by two employees of ARKLA (Arkansas Louisiana Gas Company) to provide new ways to sell natural gas to their customers. Since then, grilling has continued to grow in popularity and is practiced in many venues from parks, backyards, and even public events such as sporting events. The present invention features a novel barbeque grill and outdoor patio accessory system having an automotive theme.

SUMMARY

The present invention features a barbeque grill and outdoor patio accessory system having an automotive theme. In some embodiments, the system comprises a grill structure, a grill lower housing, a burner, a fuel source, an external burner assembly, and a storage area. In some embodiments, a fuel regulation assembly comprises an on/off valve close to the fuel source and a control valve for regulating the flow of fuel.

In some embodiments, the system comprises a themed multi-component automobile-shaped upper housing having a first side upper housing, a second side upper housing, and a central upper housing. In some embodiments, the upper housing comprises a general form of an automobile. In some embodiments, a printed design pertaining to an automotive theme is located on the upper housing.

In some embodiments, the system comprises a themed grill control panel having a general form of an automobile dashboard. In some embodiments, a printed design pertaining to an automotive dashboard is located on the control panel. In some embodiments, the control panel comprises a keyed switch operatively connected to an audio playback system and a burner igniter, a manual activation knob for the burner igniter, a temperature gauge, the control valve, and a power supply operatively connected to the keyed switch. In some embodiments, upon activation of the keyed switch the burner igniter provides the ignition spark for the burner. In some embodiments, upon activation of the manual activation knob the burner igniter provides the ignition spark for the burner. In some embodiments, upon activation of the keyed switch, the audio playback system plays pre-recorded audio themed sounds.

In some embodiments, the system comprises a themed integrated patio lighting assembly having a light housing comprising a general shape of an automobile wheel and tire assembly, and a telescopic pole. In some embodiments, the light housing is located in a general area with respect to the wheel and tire assembly located on a typical automobile on the first side upper housing. In some embodiments, the lighting member can be extended out and away from the first side upper housing via the telescopic pole. In some embodiments, the lighting member is pivotally located on the pole second end via a ball and socket joint. In some embodiments, the lighting member can be positioned between an in-line position and a perpendicular position with respect to the telescopic pole.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 3 is a side view of the present invention.
FIG. 4 is a side view of the present invention.

DESCRIPTION OF PREFERRED EMBODIMENTS

Figure 1:
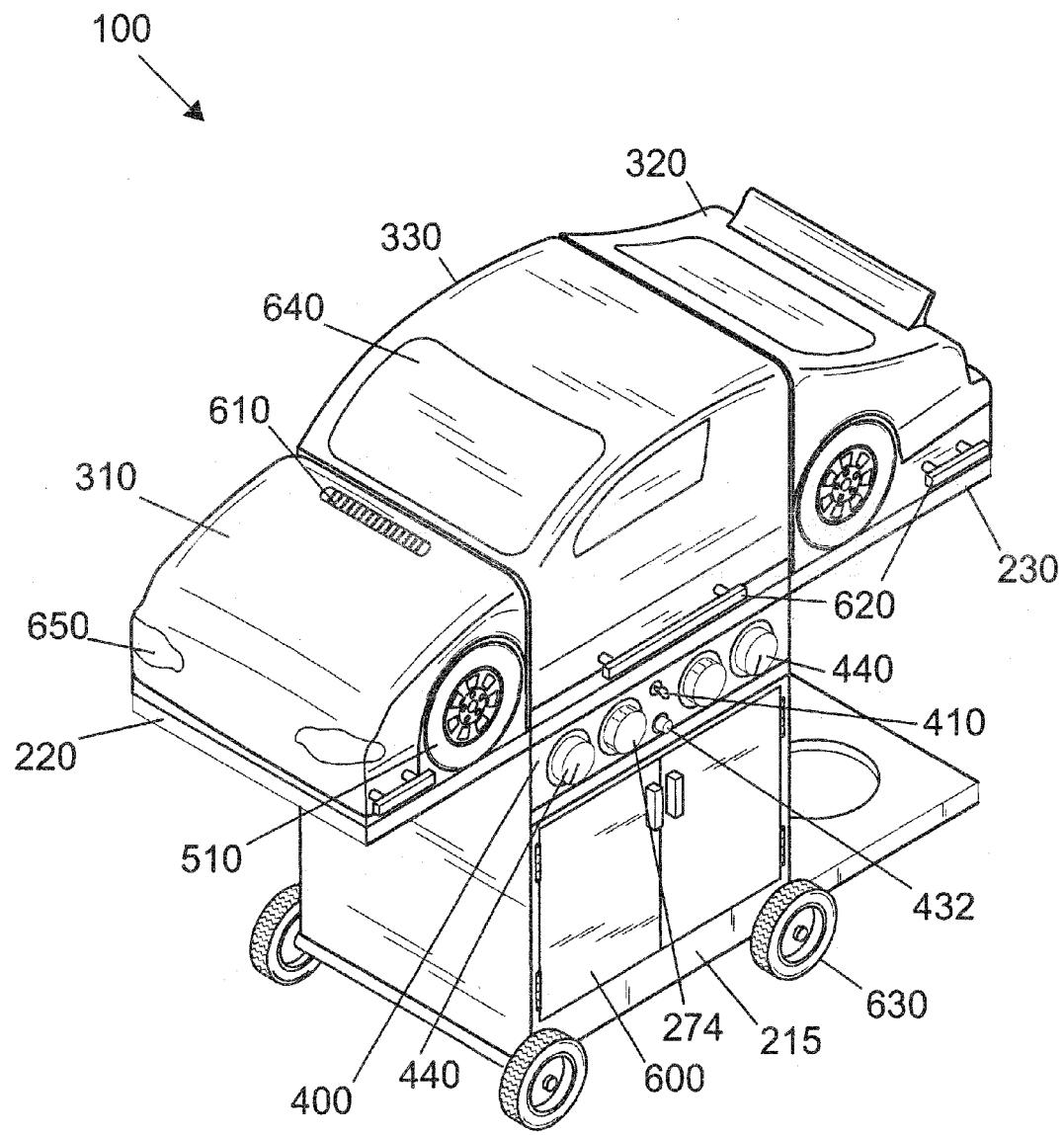
FIG. 1 is a perspective view of the present invention.
Figure 2:
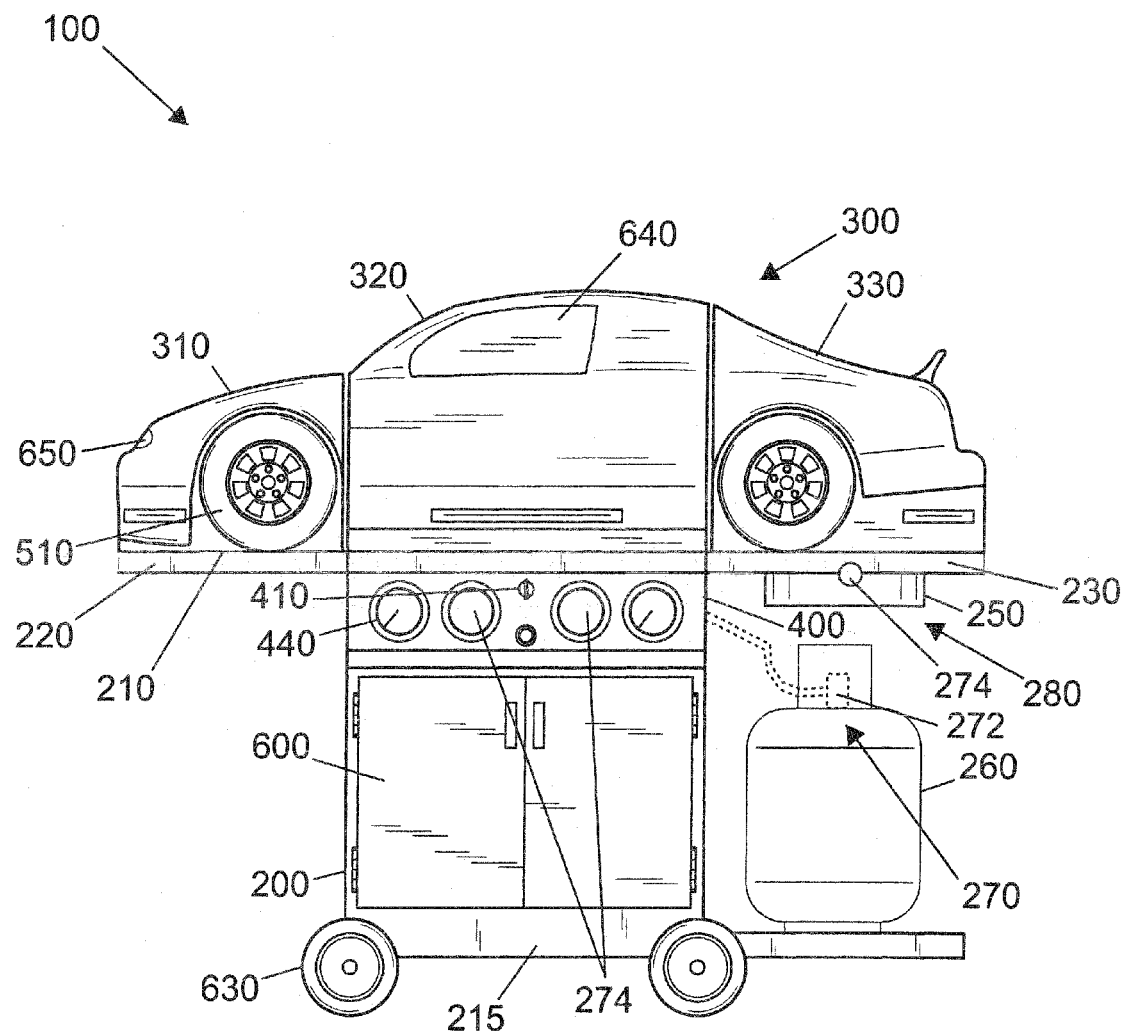
FIG. 2 is a front view of the present invention.
Figure 5:
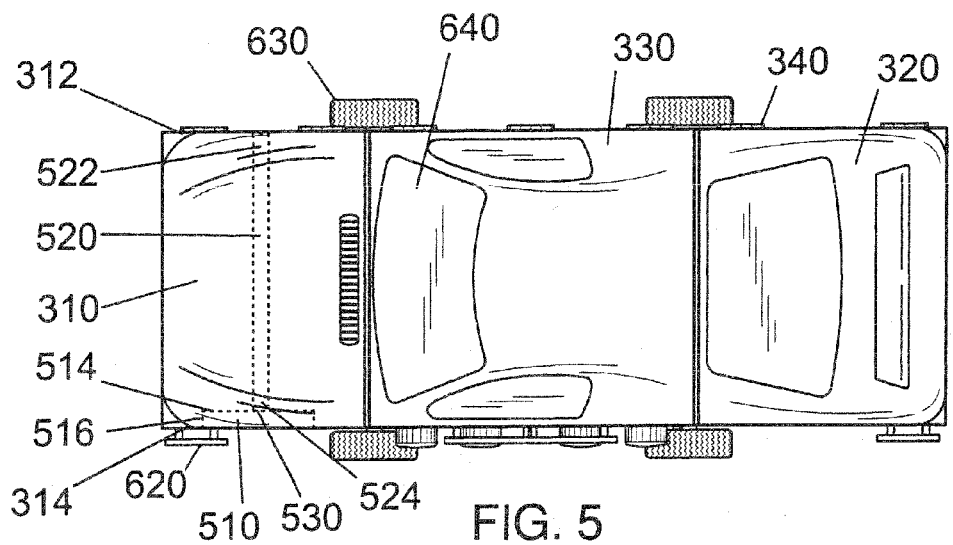
FIG. 5 is a top view of the present invention.
Figure 6:
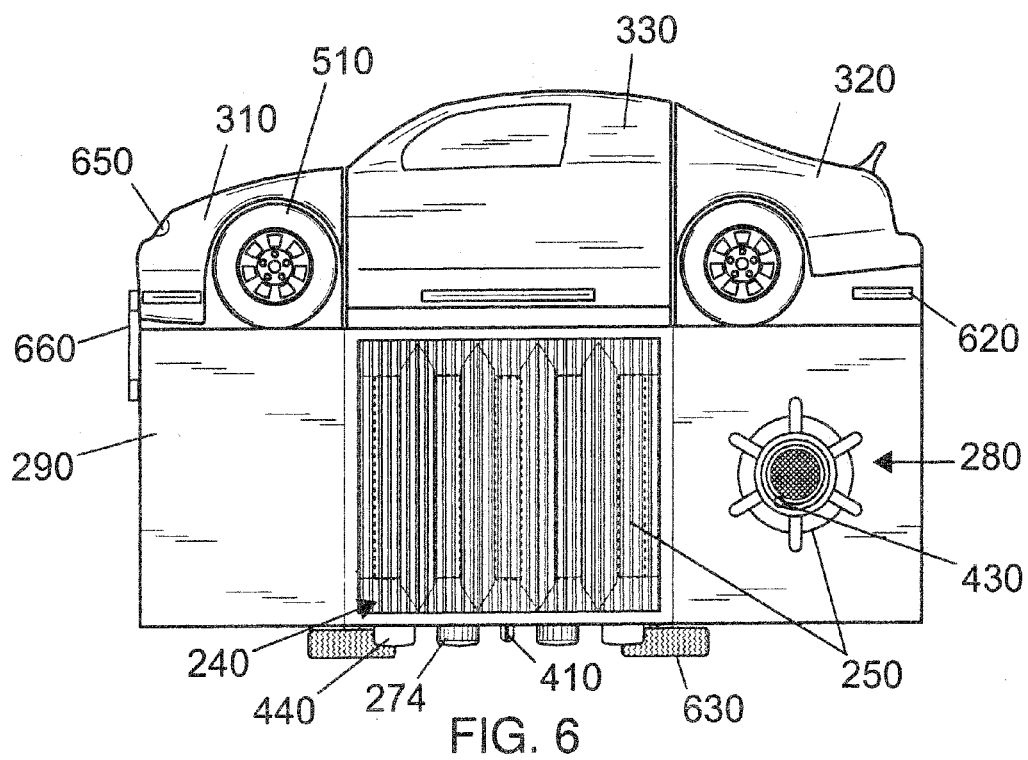
FIG. 6 is a top view of the present invention with a raised upper housing.

Following is a list of elements corresponding to a particular element referred to herein:
100 Barbeque grill and outdoor patio accessory system
200 Grill structure
210 Grill structure top
215 Grill structure bottom
220 Grill structure first side
230 Grill structure second side
240 Grill lower housing
250 Burner
260 Fuel source
270 Fuel regulation assembly
272 On/off valve
274 Control valve
280 External burner assembly
290 Storage area
300 Upper housing
310 First side upper housing
312 First side upper housing posterior interior surface
314 First side upper housing anterior interior surface
320 Second side upper housing
330 Central upper housing
340 Hinge
400 Control panel
410 Keyed switch
420 Audio playback system
422 Speaker
430 Burner igniter
432 Manual activation knob
440 Temperature gauge
450 Power supply
500 Patio lighting assembly
510 Light housing
512 Lighting member
514 Light housing bottom surface
516 Light housing peripheral surface
520 Telescopic pole
522 Pole first end
524 Pole second end
530 Ball and socket joint
600 Enclosure
610 Vent
620 Handle
630 Wheel
640 Window
650 Exterior light Referring now to FIG. 1-6, the present invention features a barbeque grill and outdoor patio accessory system (100) having an automotive theme.

In some embodiments, the system (100) comprises a grill structure (200), a grill lower housing (240) located on a grill structure top (210), a burner (250) located in the grill lower housing (240), a fuel source (260) fluidly connected to the burner (250) via a fuel regulation assembly (270), an external burner assembly (280) located on the grill structure top (210) close to a grill structure second side (230), and a storage area (290) located on a grill structure top (210) close to a grill structure first side (220). In some embodiments, the fuel regulation assembly (270) comprises an on/off valve (272) close to the fuel source (260) and a control valve (274) for regulating the flow of fuel. In some embodiments, the external burner assembly (280) comprises a burner (250) and a control valve (274) for regulating the flow of fuel.

In some embodiments, the system (100) comprises a themed multi-component automobile-shaped upper housing (300) having a first side upper housing (310), a second side upper housing (320), and a central upper housing (330). In some embodiments, the first side upper housing (310) is pivotally located above the storage area (290) on the grill structure first side (220) via a first hinge (340). In some embodiments, the second side upper housing (320) is pivotally located above the external burner assembly (280) on the grill structure second side (230) via a second hinge (340). In some embodiments, the central upper housing (330) is pivotally located on the grill lower housing (240) via a third hinge (340). In some embodiments, the upper housing (300) comprises a general form of an automobile. In some embodiments, a printed design pertaining to an automotive theme is located on the upper housing (300).

In some embodiments, the system (100) comprises a themed grill control panel (400) comprising a general form of an automobile dashboard. In some embodiments, a printed design pertaining to an automotive dashboard is located on the control panel (400). In some embodiments, the control panel (400) comprises a keyed switch (410) located therein operatively connected to an audio playback system (420) and a burner igniter (430), a manual activation knob for the burner igniter (430) located therein, a temperature gauge (440) located therein, the control valve (274) located therein, and a power supply (450) operatively connected to the keyed switch (410). In some embodiments, the burner igniter (430) is for providing an ignition spark for the burner (250). In some embodiments, upon activation of the keyed switch (410) the burner igniter (430) provides the ignition spark for the burner (250). In some embodiments, upon activation of the manual activation knob (432) the burner igniter (430) provides the ignition spark for the burner (250). In some embodiments, the audio playback system (420) comprises pre-recorded automotive themed sounds. In some embodiments, upon activation of the keyed switch (410), the audio playback system (420) plays pre-recorded audio themed sounds through a speaker (422).

In some embodiments, the system (100) comprises a themed integrated patio lighting assembly (500) having a light housing (510) comprising a general shape of an automobile wheel and tire assembly, a telescopic pole (520) having a pole first end (522) located on and affixed to the first side upper housing posterior interior surface (312) and a pole second end (524) slidably located on and affixed to the first side upper housing anterior interior surface (314). In some embodiments, the light housing (510) is pivotally located on the pole second end (524). In some embodiments, the light housing (510) is located in a general area with respect to the wheel and tire assembly located on a typical automobile on the first side upper housing (310). In some embodiments, the light housing (510) comprises a first lighting member (512) located on the light housing bottom surface (514). In some embodiments, the light housing (510) comprises a second lighting member (512) located on the light housing peripheral surface (516). In some embodiments, the lighting member (512) is operatively connected to the power supply (450). In some embodiments, the lighting member (512) can be extended out and away from the first side upper housing (310) via the telescopic pole (520). In some embodiments, the lighting member (512) is pivotally located on the pole second end (524) via a ball and socket joint (530). In some embodiments, the lighting member (512) can be positioned at an angle between 0 and 90 degrees with respect to the telescopic pole (520). In some embodiments, the lighting member (512) can be positioned between an in-line position and a perpendicular position with respect to the telescopic pole (520).

In some embodiments, the grill structure (200) comprises a lower grill enclosure (600) located thereon.

In some embodiments, the upper housing (300) comprises a vent (610) located thereon.

In some embodiments, the upper housing (300) comprises a handle (620) located thereon.

In some embodiments, the grill structure (200) comprises a wheel (620) located on a grill structure bottom (215) for rolling on a ground surface.

In some embodiments, the first side upper housing (310) comprises a transparent window (640) located therein. In some embodiments, the window (640) is located in a general area with respect to a window (640) located on a typical automobile on a first side upper housing (310).

In some embodiments, the first side upper housing (310) comprises an exterior light (650) located thereon operatively connected to the power source. In some embodiments, the exterior light (650) is located in a general area with respect to a headlight located on a typical automobile on the first side upper housing (310).

In some embodiments, the first side upper housing (310) comprises a lock (660) to firmly hold it into a generally vertical raised position.

As used herein, the term "about" refers to plus or minus 10% of the referenced number. For example, an embodiment wherein the grill structure is about 60 inches in length includes a grill structure that is between 54 and 66 inches in length.

The disclosures of the following U.S. Patents are incorporated in their entirety by reference herein: U.S. Pat. No. D 497,076; U.S. Pat. No. D 485,115; U.S. Pat. No. D 442,818; U.S. Pat. No. D 436,284; U.S. Pat. No. D 429,944; U.S. Pat. No. 6,298,774.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the

What is claimed is:

1. A barbeque grill and outdoor patio accessory system (100) with an automotive theme wherein said system (100) consists of:
   (a) a grill structure (200), a grill lower housing (240) disposed on a grill structure top (210), a burner (250) disposed in the grill lower housing (240), a fuel source (260) fluidly connected to the burner (250) via a fuel regulation assembly (270), an external burner assembly (280) disposed on the grill structure top (210) proximal to a grill structure second side (230), and a storage area (290) disposed on a grill structure top (210) proximal to a grill structure first side (220), wherein the fuel regulation assembly (270) consists of an on/off valve (272) proximal to the fuel source (260) and a control valve (274) for regulating the flow of fuel, wherein the external burner assembly (280) consists of a burner (250) and a control valve (274) for regulating the flow of fuel;
   (b) a themed multi-component automobile-shaped upper housing (300) having a first side upper housing (310), a second side upper housing (320), and a central upper housing (330), wherein the first side upper housing (310) is pivotally disposed above the storage area (290) on the grill structure first side (220) via a first hinge (340), wherein the second side upper housing (320) is pivotally disposed above the external burner assembly (280) on the grill structure second side (230) via a second hinge (340), wherein the central upper housing (330) is pivotally disposed on the grill lower housing (240) via a third hinge (340), wherein the upper housing (300) consists of a general form of an automobile, wherein a printed design pertaining to an automotive theme is disposed on the upper housing (300);
   (c) a themed grill control panel (400) consisting of a general form of an automobile dashboard, wherein a printed design pertaining to an automotive dashboard is disposed on the control panel (400), wherein the control panel (400) consists of a keyed switch (410) disposed therein operatively connected to an audio playback system (420) and a burner igniter (430), a manual activation knob for the burner igniter (430) disposed therein, a temperature gauge (440) disposed therein, the control valve (274) disposed therein, and a power supply (450) operatively connected to the keyed switch (410), wherein the burner igniter (430) is for providing an ignition spark for the burner (250), wherein upon activation of the keyed switch (410) the burner igniter (430) provides the ignition spark for the burner (250), wherein upon activation of the manual activation knob (432) the burner igniter (430) provides the ignition spark for the burner (250), wherein the audio playback system (420) consists of pre-recorded automotive themed sounds, wherein upon activation of the keyed switch (410), the audio playback system (420) plays pre-recorded audio themed sounds through a speaker (422); and
   (d) a themed integrated patio lighting assembly (500) having a light housing (510) consisting of a general shape of an automobile wheel and tire assembly, a telescopic pole (520) having a pole first end (522) disposed on and affixed to the first side upper housing posterior interior surface (312) and a pole second end (524) disposed on and affixed to the first side upper housing anterior interior surface (314), wherein the light housing (510) is pivotally disposed on the pole second end (524), wherein the light housing (510) is disposed in a general area with respect to the wheel and tire assembly disposed on a typical automobile on the first side upper housing (310), wherein the light housing (510) consists of a first lighting member (512) disposed on the light housing bottom surface (514), wherein the light housing (510) consists of a second lighting member (512) disposed on the light housing peripheral surface (516), wherein the lighting member (512) is operatively connected to the power supply (450), wherein the lighting member (512) can be extended out and away from the first side upper housing (310) via the telescopic pole (520), wherein the lighting member (512) is pivotally disposed on the pole second end (524) via a ball and socket joint (530), wherein the lighting member (512) can be positioned at an angle between 0 and 90 degrees with respect to the telescopic pole (520), wherein the lighting member (512) can be positioned between an in-line position and a perpendicular position with respect to the telescopic pole (520);
wherein when the lighting assembly (500) is in a first position, the telescopic pole (520) and the light housing (510) retract into the first side upper housing (310) for storing the lighting assembly (500); wherein when the lighting assembly (500) is in a second position, the telescopic pole (520) and the light housing (510) extend away from the first side upper housing (310) for use of the lighting assembly (500).

* * * * *